United States Patent [19]
Downs et al.

[11] Patent Number: 5,919,834
[45] Date of Patent: Jul. 6, 1999

[54] U-V CURED HEAT ACTIVATED LABELS FOR SUBSTRATES AND PREPARATION METHODS THEREFORE

[75] Inventors: Myron H. Downs, Simsbury; James D. Singelyn, Newington; Bruce W. Downs, S. Glastonbury, all of Conn.

[73] Assignee: Illinois Tool Works Inc., Glenview, Ill.

[21] Appl. No.: 08/937,814

[22] Filed: Sep. 29, 1997

Related U.S. Application Data

[63] Continuation of application No. 08/514,401, Aug. 11, 1995, abandoned.

[51] Int. Cl.$^6$ ....................................................... C08F 2/46
[52] U.S. Cl. ............................... 522/33; 522/95; 522/102; 522/114; 522/135; 522/81; 522/75; 522/96; 522/103
[58] Field of Search ............................... 522/95, 102, 33, 522/114, 135, 81, 75, 96, 103

[56] References Cited

U.S. PATENT DOCUMENTS

| | | | |
|---|---|---|---|
| 3,781,214 | 12/1973 | Nemoto et al. | 522/75 |
| 3,957,694 | 5/1976 | Bolon et al. | 522/81 |
| 3,968,056 | 7/1976 | Bolon et al. | 522/81 |
| 3,989,644 | 11/1976 | Bolon et al. | 522/81 |
| 4,264,483 | 4/1981 | Laufer et al. | 522/81 |
| 4,303,696 | 12/1981 | Brack | 427/44 |
| 4,337,289 | 6/1982 | Reed et al. | 428/195 |
| 4,421,429 | 12/1983 | Graham | 400/120 |
| 4,610,941 | 9/1986 | Sullivan | 430/6 |
| 4,680,368 | 7/1987 | Nakamoto et al. | 528/49 |
| 4,704,310 | 11/1987 | Tighe et al. | 427/261 |
| 4,786,349 | 11/1988 | Mahn, Sr. | 156/234 |
| 4,816,295 | 3/1989 | Cardinale | 427/54.1 |
| 5,165,340 | 11/1992 | Karlyn et al. | 101/126 |
| 5,250,361 | 10/1993 | Ide et al. | 428/500 |
| 5,268,347 | 12/1993 | Okumura et al. | 503/227 |
| 5,587,405 | 12/1996 | Tanaka et al. | 522/98 |

*Primary Examiner*—M. Nuzzolillo
*Assistant Examiner*—Steven H. VerSteeg
*Attorney, Agent, or Firm*—Kane, Dalsimer, Sullivan, Kurucz, Levy, Eisele, and Richard, LLP

[57] ABSTRACT

Disclosed are UV-cured heat transfer labels prepared from a mixture containing at least one thermoplastic resin, at least one material for solvating the thermoplastic resin, the solvating material being either a solvent or liquid monomer, and at least one photo-initiable material which initiates curing of the composition.

12 Claims, No Drawings

U-V CURED HEAT ACTIVATED LABELS FOR SUBSTRATES AND PREPARATION METHODS THEREFORE

This application is a continuation of application Ser. No. 08/514,401, filed Aug. 11, 1995, now abandoned.

FIELD OF INVENTION

The present invention is directed to heat transfer labels, for application to substrates, wherein the labels are screened onto carrier film or webs, cured with the UV radiation, and then applied to the substrate with application of heat and pressure.

BACKGROUND OF THE INVENTION

Heat transfer labels are used to decorate items by effecting transfer of the label to the item upon application of heat and pressure. The labels consist of inks containing a thermoplastic which softens and flows when heated so that it conforms to the decorated surface. Currently, known thermoplastic ink systems are solvent or water-based type systems, with solvent-based systems predominating.

Ultraviolet-curing ink systems which cure upon exposure to ultraviolet light are generally known in the art. NORCOTE INTERNATIONAL provides UV-curing inks for the screen printing industry known as Series 02, Series 70, and Series 80. These inks, however, have not performed adequately when applied to webs used to apply heat transfer labels. With application of heat and pressure, these labels did not transfer to styrene or acrylonitrile-butadiene-styrene (ABS) copolymer, which are the most readily decorated substrates, regardless of the variance of temperature, pressure, and time. Under-curing the ink provided transfer of some of the ink to the substrate as a ghost-image, but it does not offer any adhesion to the part. Simply affixing tape over the label and removing the tape resulted in the removal of the label as well.

More recently, ink manufacturers, including Craig Adhesives & Coatings Company, of Newark, N.J. have developed coatings that will accept writing, glue or hot stamp decoration while maintaining good intercoat adhesion. However, when tested for use as heat transfer inks, new coatings did not provide enough thermoplasticity and tack for transfer and adhesion to ABS, styrene or other common substrates.

For an ink to be effective in the preparation of a heat transfer label, it must soften and develop tack at a temperature above room temperature and possess sufficient cohesive strength to transfer completely from the carrier web to the substrate to be decorated. Once adhesion has been established on the substrate, it must be strong enough to retain the complete image as the carrier web is removed from the ink and substrate. Once the decorated part has cooled to room temperature, the ink must pass minimal adhesion tests, normally specified in the industry by applying an adhesive tape to the ink surface and pulling the tape away from the substrate at right angles to the surface in an attempt to remove the image with the tape.

SUMMARY OF THE INVENTION

It is an object of the present invention to provide heat transfer labels that are alternatives to those presently available and which will exhibit good adhesion and resistance to removal when applied to common substrates such as ABS or styrene. It is a further object to develop such labels from inks cured with UV radiation. Such labels would not emit volatile organic compounds during the process and would also exhibit improved abrasion resistance and chemical resistance when compared to the existing solvent-based or water based ink systems.

Generally, the UV-cured heat transfer labels of the present invention are prepared from a mixture containing at least one thermoplastic resin, at least one material for solvating the thermoplastic resin, the solvating material being either a solvent or liquid monomer, and at least one photo-initiable material which initiates curing of the composition. The presence of the photoinitiable material, hereinafter referred to as an initiator, initiates a curing reaction within the ink upon exposure to UV radiation. It is often preferable to include an oligomer in the composition as well, since coating strength and solvent resistance appear to be improved with the introduction of an oligomer that reacts with an initiator.

Conventional ingredients may be included in the compositions, such as pigments or viscosity-reducing additives such as fused silica, dispersing aids, defoaming agents and other surface modifying materials.

While not wishing to be bound by any theory, the presence of the photocuring initiators is believed to provide enhanced physical and chemical properties normally not found in solvent or water-based heat transfer inks, while the presence of the thermoplastic resin is believed to provide good mechanical adhesion to the labelled substrates.

Another aspect of the present invention is a clear topcoat layer which also cures upon exposure to UV radiation. The heat transfer labels constituted of the UV curing inks previously described can be printed directly upon the UV topcoats. While it is believed that the UV-curing inks of the present invention exhibit an acceptable degree of abrasion resistance and chemical resistance in ordinary situations, the combination of a UV curing ink and a UV topcoat will provide additional wear resistance when necessary.

Substrates suited for labelling with the present invention include acrylonitrile-butadiene-styrene copolymer, polystyrene, polyethylene, polycarbonate, polypropylene, blends thereof, aluminum, and stainless steel.

DETAILED DESCRIPTION OF THE PREFERRED EMBODIMENTS

In the UV curing heat transfer labels of the present invention, a thermoplastic resin is dissolved in either a solvent or a monomer and incorporated into a finished photoinitiated ink system. It should be understood that any solvent or monomer which can dissolve the thermoplastic resin component and remain compatible with the other components of the labels are acceptable. Those which are suitable include: 2-butoxyethyl acetate, Aromatic 100 (a blend of C9 aromatic hydrocarbons), Aromatic 150 (a blend of C10 aromatic hydrocarbons), and cyclohexanone. Suitable monomers for dissolving the thermoplastic resin component include esters of acrylic acid and methacrylic acid such as lauryl acrylate, isobornyl acrylate, 2-phenoxyethyl acrylate, glycidyl methacrylate, tetraethoxylated nonylphenol acrylate, and propoxylated neopentyl glycol diacrylate.

Thermoplastic resins suitable for the heat transfer labels of the present invention include epoxies, polyurethanes, polymethacrylates, polyethylene vinyl acetates, polyvinyl chlorides, chlorinated halogenated polyolefins such as chlorinated and fluorinated polyolefins, and polystyrene.

Additionally, thermoplasticity (i.e.—adhesion) can be promoted by preparing a coating made from monofunctional acrylates. Oligomer can be added to improve the physical and chemical properties of the finished coating with the understanding that the heat transfer temperature, the minimum temperature at which transfer occurs, increases with increasing dilution of the polymerized monofunctional acrylate.

Suitable photocurable monomer initiators include benzophenone, alpha ketone, thiophenyl morpholinopropanone (Irgacure 907), morpholinophenylaminohexanone (Irgacure 369), cyclohexylphenyl ketone (Irgacure 184), hydroxyphenylpropanone (Darocur 1173), and isopropylthioxanthone (Quantacure ITX), alkylated benzophenone (Esacure TZT), diphenyl (2,4,6-trimethylbenzoyl) phosphine oxide (Lucirin TPO), and poly 4-(2-hydroxy-2-methylpropionyl) alpha-methyl styrene (Escacure KIP-100F). Irgacure 907, 369, 184 and Daracur 1173 are products available from Ciba-Geigy. Quantacure ITX is a product from Biddle Sawyer. Esacure TZT and KIP-100F are products of the Sartomer Corporation. Lucirin TPO is a product of the BASF Corporation. Generally, suitable initiators as those which produce free radicals upon exposure to UV radiation.

Coating strength and solvent resistance is improved by including photoinitiable oligomers in addition to photoinitiable monomers within the UV curing heat transfer label. Two suitable initiators of this kind are a urethane acrylate designated as CN 966J75 and an epoxy acrylate designated as CN 104, both available from Sartomer, Inc. Concentrations of up to 30% based on total resin weight have been effective. Higher concentrations can provide a curable film, but heat transfer properties appear to be compromised.

Curing can be effected by a Fusion Systems light source, using either a doped mercury type "D" or "V" lamp. The "D" outputs in the wavelength range of 340–390 nm. The "V" lamp outputs in the 400–430 nm. range. The choice of pigment and initiator dictate which range (i.e.—lamp) to use, and the selection process would be readily understood by the artisan skilled in printing with traditional UV curing inks.

The following examples illustrate the suitable compositions of the present invention and the beneficial results achieved thereby. The Examples are not intended to limit the scope of the present invention in any way.

"Parts", as used in the following Examples, refers to parts by weight.

EXAMPLE 1

A heat transfer ink was prepared by combining 80 parts CN104 oligomer, 42.7 parts glycidyl methacrylate, 54.7 Elvacite 2016 available from ICI Acrylics of Wilmington, Del., 90.7 parts isobornyl acrylate, 20 parts Irgazin DPP Red BO available from Ciba Pigments of Newport, Del., 7.5 parts Irgacure 369, 0.8 parts AntiTerra U-100 available from BYK Chemie, U.S.A., Wallingford, Conn. and 4 parts Lithene PL, available from Special Electric Co., Inc. Cleveland, Ohio. The ink was printed onto a continuous polyester web (film) using a flat polyester screen wherein a polyurethane squeegee is passed over the screen forcing the ink through openings in the screen. The squeegee can be actuated manually or mechanically, both having been tried. The polyester screen had a stencil of emulsion firmly bound to the screen which defined an image to test graphic print quality. The printed image was then passed under a Fusion Systems UV lightsource at 27 ft/min using a doped mercury type "D" lamp emiting in the 340–390 nm output range. After curing, the coating was placed on flat test coupons of various materials and transferred to the coupon from the film at temperatures ranging from 350–400° F. and 300 pounds force per square inch of part area. A one-half (0.5) ton vertical stamping press, manufactured by Kensol, Inc. was used to transfer the label. Air pressure to the cylinder was adjusted to accommodate the areas dewatered. Materials accepting the coating with complete adhesion included ABS, high impact polystyrene (HIPS), and polycarbonate.

EXAMPLE 2

A heat transfer ink was prepared by combining 16.75 parts CP 164 chlorinated polyolefin, available from Eastman Chemical, 44 parts isobornyl acrylate, 44 parts glycidyl acrylate, 22.65 parts CN 104 oligomer, 20.1 parts lauryl acrylate, 6 parts Irgacure 1173, and 3 parts Irgacure 369. The ink was screened onto a carrier web and cured at 27 feet per minute under 300 Watts/inch UV light using an electrodeless lamp emitting most strongly in the 340 nm to 390 nm range. After curing, the coating was placed on a flat polyethylene test coupon and transferred from the film at 450° F. and 300 pounds force per square inch of part area.

EXAMPLE 3

Example 2 was repeated with the omission of lauryl acrylate, CN 104, and Irgacure 369 with good transfer and adhesion results on polyethylene.

EXAMPLE 4

Example 2 was repeated with the inclusion of 2 parts Lithene PL, 1 part of AntiTerra U-100, and 10.1 parts Irgazin DPP Red BO. Results on polyethylene showed good transfer and adhesion.

EXAMPLE 5

A heat transfer label was prepared from 100 parts isobornyl acrylate, 20 parts glycidyl acrylate, 47.6 parts thermoplastic resin, 59 parts CN 104 oligomer, 2.3 parts Lithene PL,, 31.9 parts titanium dioxide, 3 parts CI Pigment Blue 15:3, 0.7 parts AntiTerra U-100, 6.8 parts Darocure 4265, 5.23 parts Irgacure 369, 1.3 parts Quantacure ITX, 28.3 parts polytetrafluoroethylene beads, and 3–7 parts fused silica to obtain proper printing viscosity. The thermoplastic resins used in this composition included Elvacite 2013, Acryloid B-66, and Piccotex 120. All labels transferred to HIPS and ABS with good adhesion. In adhesive tape testings using 3M Brand Scotch Tape 810, no removal of design was observed.

EXAMPLE 6

A heat transfer label was prepared from 102.5 parts isobornyl acrylate, 17.5 parts CP 164, 18.5 parts lauryl acrylate, 5 parts Darocure 369, 3 parts Monarch 120 carbon black, available from Cabot Corporation, Boston, Mass. and 0.1 part AntiTerra U-100. The ink was screened onto a carrier web and cured at 27 feet per minute under 300 Watts/inch UV light using an electrodeless lamp emitting most strongly in the 340 nm to 390 nm range. The coating was transferred to polyethylene at 450° F. and polypropylene at 400° F. Good transfer and adhesion were obtained.

The experiment was repeated with 10.3 parts Monarch 120 instead of 3 parts, curing with two passes of irradiation under the same conditions. Transfer was good, as was adhesion.

EXAMPLE 7

A series of thermoplastic resins were evaluated and shown to offer a UV curable coating with the ability to transfer to HIPS with good adhesion. These included:

A—26% CP 343-1 (Eastman Chemical) in isobornyl acrylate

B—18.2% Phenoxy Resin PKHC (Phenoxy Associates) in 70:30 isobornyl acrylate: glycidyl acrylate C—40% Piccolastic D125 (Hercules) in isobornyl acrylate D—20% Elvax 40W (DuPont) in isobornyl acrylate E—40% Piccotex A 100 (Hercules) in isobornyl acrylate F—14% VYHD (Union Carbide) in 82:18 isobornyl acrylate: glycidyl acrylate G—33.3% Epon 1009F (Shell) in 70:30 isobornyl acrylate:glycidyl acrylate

| | Parts (by weight) | | | | | | |
|---|---|---|---|---|---|---|---|
| Resin Solution A | 162.6 | | | | | | |
| Resin Solution B | | 146 | | | | | |
| Resin Solution C | | | 200 | | | | |
| Resin Solution D | | | | 150 | | | |
| Resin Solution E | | | | | 200 | | |
| Resin Solution F | | | | | | 140 | |
| Resin Solution G | | | | | | | 180 |
| AntiTerra U-100 | 1.3 | 1.3 | 1.3 | 1.3 | 1.3 | 1.3 | 1.3 |
| Lithene PL | 2.4 | 2.4 | 2.4 | 2.4 | 2.4 | 2.4 | 2.4 |
| Titanium Dioxide | 120 | 120 | 120 | 120 | 120 | 120 | 120 |
| Cab-O-Sil TS-610 | 8 | 4 | 6 | 3 | 5.8 | 2.4 | 6 |
| Darocur 4265 | 12 | 12 | 12 | 12 | 12 | 12 | 12 |

All of the above were screened onto a carrier web and cured at 40 feet per minute under 400 Watts/inch UV light using an electrodeless lamp emitting most strongly in the 400 nm to 430 nm range. After curing the coating was transferred to high-impact polystyrene (HIPS) from the film at 380° F. Good adhesion was observed in all applications.

EXAMPLE 8

A hard, clear topcoat was prepared from 100 parts CN 964E75, 120 parts dipentaerythritol-pentaacrylate, 3.3 parts Lithene PL, 100 parts triethoxylated trimethylolpropane triacrylate, and 14 parts Darocure 1173. The ink was screened onto a carrier web and cured at 27 feet per minute under 300 Watts/inch UV light using an electrodeless lamp emitting most strongly in the 340 nm to 390 nm range. Onto this layer was screened a heat transferable coating prepared from 60 parts 2-phenoxyethyl acrylate, 40 parts Elvacite 2016, 20 parts CN 966J75, 12 parts tetraethoxynonylphenol acrylate, 2 parts Lithene PL, and 9 parts Darocure 1173. Transfer was made from the carrier web to ABS or HIPS at 350° F. with good adhesion.

Comparison Example 1

A commercial UV curing coating Craigcoat 1077HS from Craig Coat Adhesive was cured at 40 feet per minute and 400 Watts/inch. This material contains an acrylate ester of bisphenol A-epoxy, monomeric and oligomeric multifunctional acrylates and benzophenone. The resulting film was immediately tested and partially transferred at 380° F. onto HIPS with poor adhesion. Three hours after curing the film, the coating did not transfer to the part at all under the test conditions.

Comparison Example 2

Another commercial UV curing ink Nor-Cote 8010195A (black) was tested. Alone, a film was produced on curing which did not transfer to either ABS or HIPS.

EXAMPLE 9

37.5 parts of 40% Acryloid B-66 in 2-butoxyethanol acetate were added to 85 parts of Nor-Cote 8010195A. The resulting ink was screened onto a carrier web and forced hot air dried to remove solvent. The ink was cured at 40 feet per minute under 300 Watts/inch UV light using an electrodeless lamp emitting most strongly in the 340 nm to 390 nm range. The coating was tested for transfer, transferring completely with good adhesion to ABS and HIPS. The experiment was similarly performed replacing the Acryloid B-66 solution for Elvacite 2046 at the same concentration. Results were the same, showing good transfer and adhesion to ABS and HIPS.

Table 1 sets forth a list of components used in the present disclosure.

TABLE 1

| Name | Generic Description | Component | Manufacturer |
|---|---|---|---|
| Aromatic 100 | blend of C9 hydrocarbon | solvent | Exxon Chemical Company |
| Aromatic 150 | blend of C10 hydrocarbon | solvent | Exxon Chemical Company |
| Butyl Cellosolve Acetate | 2-butoxyethyl acetate | solvent | Union Carbide Chemicals & Plastic Co. |
| Cyclohexanone | cyclohexanone | solvent | Union Carbide Chemicals & Plastics Co. |
| SR 335 | lauryl acrylate | monomer | Sartomer Corporation |
| SR 506 | isobornyl acrylate | monomer | Sartomer Corporation |
| SR 379 | glycidyl methacrylate | monomer | Sartomer Corporation |
| SR 339 | 2-phenoxyethyl acrylate | monomer | Sartomer Corporation |
| CD 504 | tetraethoxylated nonylphenol acrylate | monomer | Sartomer Corporation |
| SR 9003 | propoxylated neopentyl glycol diacrylate | monomer | Sartomer Corporation |
| | epoxies* | thermoplastic resin | |
| | polyurethanes* | thermoplastic resin | |
| | polymethacrylates* | thermoplastic resin | |
| | polyethylene vinyl acetates* | thermoplastic resin | |
| | polyvinyl chlorides* | thermoplastic resin | |
| | chlorinated polyolefins* | thermoplastic resin | |
| | polystyrene* | thermoplastic resin | |
| Esacure TZT | alkylated benzophenone | initiator | Sartomer Corporation |
| Esacure KIP 100F | alpha hydroxy ketone | initiator | Sartomer Corporation |
| Irgacure 907 | thiophenyl morpholinopropanone | initiator | Ciba-Geigy |
| Irgacure 369 | morpholinophenyl-aminohexanone | initiator | Ciba-Geigy |
| Irgacure 184 | cyclohexlphenyl ketone | initiator | Ciba-Geigy |
| Darocure 1173 | hydroxy-phenylpropanone | initiator | Ciba-Geigy |
| Quantacure ITX | isopropylthioxanthone | initiator | Biddle-Sawyer |
| Esacure TZT | alkylated benzophenone | initiator | Sartomer Corporation |
| Lucirin TPO | diphenyl (2,4,6,-trimethylbenzoyl) phosphine oxide | initiator | BASF Corp. |
| Esacure KIP-100F | poly 4-(2-hydroxy-2-methylpropionyl) alpha-methyl styrene | initiator | Sartomer Corporation |
| CN 966J75 | urethane acrylate | oligomer | Sartomer, Inc. |

TABLE 1-continued

| Name | Generic Description | Component | Manufacturer |
|---|---|---|---|
| CN 104 | epoxy acrylate | oligomer | Sartomer, Inc. |
| Elvacite 2016 | methyl/n-butyl methacrylate copolymer | thermoplastic resin | ICI Acrylics |
| Irgazin DPP Red B0 | CI Pigment Red 254 | pigment | Ciba-Geigy |
| Lithene PL | polybutadiene | surfactant | Special Electric Co, Inc. |
| Tipure | TiO$_2$ CI Pigment white 6 | Pigment | DuPont |
| CI Pigment Blue 15:3 | CI Pigment Blue 15:3 | Pigment | Ciba-Geigy |
| SST | PTFE beads | filler | Shamrock Chemical Corp. |
| Elvacite 2013 | methyl/n-butyl methacrylate copolymer | thermoplastic resin | ICI Acrylics |
| Acryloid B-66 | methyl/butyl methacrylate copolymer | thermoplastic resin | Rohm and Haas Company |
| Piccotex 120 | alpha methyl styrene/ vinyl toluene copolymer | thermoplastic resin | Hercules, Inc. |
| CP 164 | modified chlorinated polyolefin | thermoplastic resin | Eastman Chemical |
| Darocure 369 | 2-benzyl-2-(dimethylamino)-1-[4-(4-morpholinyl)phenyl]-1 butanone | initiator | Ciba-Geigy |
| Anti-Terra U-100 | salt of polyamine amides and high molecular weight acidic esters. | dispersing additive | BYK-Chemie USA Corporation. |
| Darocure 4265 | 2-hydroxy-2-methyl-1 phenge - propanone and diphenyl (2,4,6-trimethyl benzoyl) phosphine oxide | initiator | Ciba-Geigy |
| CP-343 | modified chlorinated polyolefin | thermoplastic resin | Eastman Chemical |
| Phenoxy Resin PKHC | Phenoxy resin | thermoplastic resin | Phenoxy Associates |
| Piccolastic D125 | Polystyrene | thermoplastic resin | Hercules, Inc. |
| Elvax 40W | ethylene vinyl acetate copolymer | thermoplastic resin | DuPont |
| Piccotex A100 | alpha methyl styrene/vinyl toluene copolymer | thermoplastic resin | Hercules, Inc. |
| VYHD | vinyl chloride/acetate copolymer | thermoplastic resin | Union Carbide |
| Epon 1009F | Bisphenol A/Epichlorohydrin based epoxy resin | thermoplastic resin | Shell |
| Cab-O-Sii TS-610 | treated fumed silica | thickener | Cabot Corporation |
| CN964E75 | Urethane acrylate | Photoinitiable oligomer | Sartomer Corporation |
| SR 399 | dipentaerythritolpenta-acrylate | Monomer | Sartomer Corporation |
| SR 454 | triethoxylated trimethylolpropane triacrylate | Monomer | Sartomer Corporation |
| Craigcoat 1077HS | high performance UV curing overprint varnish | commercial ink | Craig Adhesives & Coatings, Inc. |
| Nor-Cote 8010195A | screen Printing UV ink, black | commercial ink | Nor-Cote International |
| Monarch 120 | carbon black CI Pigment black 7 | Pigment | Cabot Corporation |
| Elvacite 2046 | n-butyl/isobutyl methacrylate copolymer | thermoplastic resin | ICI Acrylics |

*Generic terms only

We claim:

1. A thermoplastic heat transfer label curable by exposure to ultraviolet radiation for decorating a substrate upon application of heat and pressure while the label and substrate are in contact, the label being comprised of:

a thermoplastic resin, a material which solvates the thermoplastic resin selected from the group consisting of solvents, monomers and mixtures thereof, and an initiator which initiates curing of the label upon exposure to ultraviolet radiation, wherein the ink is transferred to the carrier and cured by exposure to ultra-violet radiation, wherein the label is applied to a carrier and cured by exposure to UV radiation prior to transfer to a substrate.

2. The heat transfer label of claim 1 wherein the thermoplastic resin is selected from the group consisting of epoxies, polyurethanes, polymethacrylates, polyethylene vinyl acetates, polyvinyl chlorides, chlorinated polyolefins, polystyrene, and mixtures thereof.

3. The heat transfer label of claim 1 wherein the initiator is selected from the group consisting of benzophenone, alpha ketone, thiophenyl morpholinopropanone, morpholinophenylaminohexanone, cyclohexylphenyl ketone, hydroxyphenylpropanone, and isopropylthioxanthone, alkylated benzophenone, diphenyl (2,4,6-trimethylbenzoyl) phosphine oxide and poly 4-(2-hydroxy-2-methylpropionyl) alpha-methyl styrene, and mixtures thereof.

4. The heat transfer label as set forth in claim 1 further comprised of an oligomer selected from the group consisting of urethane acrylates, epoxy acrylates, and mixtures thereof.

5. The heat transfer label as set forth in claim 1 wherein the material which solvates the thermoplastic resin is selected from the group consisting of 2-butoxyethyl acetate, C9 aromatic hydrocarbons, C10 aromatic hydrocarbons, cyclohexanone, lauryl acrylate, isobornyl acrylate, 2-phenoxyethyl acrylate, glycidyl methacrylate, tetraethoxylated nonylphenol acrylate, and mixtures thereof.

6. The heat transfer label of claim 1 further comprised of a top coat, the top coat comprised of an initiator and a component selected from the group consisting of a solvent and a monomer, wherein the top cop is cured with ultraviolet radiation.

7. A decorated substrate labeled with a thermoplastic, UV cured heat transfer label, comprised of:

a) a substrate; and b) a thermoplastic, UV cured heat transfer label comprised of a thermoplastic resin and a material which solvates the thermoplastic resin selected from the group consisting of solvents, monomers and mixtures thereof; an initiator which initiates the curing of the label upon exposure to ultraviolet radiation, wherein the heat transfer label has been placed upon a carrier and subsequently cured by exposure to ultraviolet radiation and transferred to the substrate with application of heat and pressure.

8. The labelled substrate of claim 7 wherein the thermoplastic resin is selected from the group consisting of epoxies, polyurethanes, polymethacrylates, polyethylene vinyl acetates, polyvinyl chlorides, chlorinated polyolefins, polystyrene, and mixtures thereof.

9. The labelled substrate of claim 7 wherein the initiator is selected from the group consisting of benzophenone, alpha ketone, thiophenyl morpholinopropanone, morpholinophenylaminohexanone, cyclohexylphenyl ketone, hydroxyphenylpropanone, isopropylthioxanthone, alkylated benzophenone, diphenyl (2,4,6-trimethylbenzoyl) phosphine oxide and poly 4-(2-hydroxy-2-methylpropionyl) alpha-methyl styrene, and mixtures thereof.

10. The labelled substrate as set forth in claim 7 further comprised of an oligomer selected from the group consisting of urethane acrylates, epoxy acrylates, and mixtures thereof.

11. The labelled substrate as set forth in claim 7 wherein the material which solvates the thermoplastic resin is selected from the group consisting of 2-butoxyethyl acetate, C9 aromatic hydrocarbons, C10 aromatic hydrocarbons, cyclohexanone, lauryl acrylate, isobornyl acrylate, 2-phenoxyethyl acrylate, glycidyl methacrylate, tetra-ethoxylated nonylphenol acrylate, and mixtures thereof.

12. The labelled substrate as set forth in claim 7 wherein the substrate is a material selected from the group consisting acrylonitrile-butadiene-styrene copolymer, polystyrene, polyethylene, polycarbonate, polypropylene, blends thereof, aluminum, and stainless steel.

* * * * *